United States Patent
Takeuchi

(10) Patent No.: US 10,351,682 B2
(45) Date of Patent: Jul. 16, 2019

(54) METHOD FOR PRODUCING COMPOSITE MOLDED ARTICLE

(71) Applicant: RIMTEC Corporation, Tokyo (JP)

(72) Inventor: Masaki Takeuchi, Tokyo (JP)

(73) Assignee: RIMTEC CORPORTION, Tokyo (JP)

( * ) Notice: Subject to any disclaimer, the term of this patent is extended or adjusted under 35 U.S.C. 154(b) by 81 days.

(21) Appl. No.: 15/106,731

(22) PCT Filed: Dec. 17, 2014

(86) PCT No.: PCT/JP2014/083362
§ 371 (c)(1),
(2) Date: Jun. 20, 2016

(87) PCT Pub. No.: WO2015/098636
PCT Pub. Date: Jul. 2, 2015

(65) Prior Publication Data
US 2017/0037202 A1    Feb. 9, 2017

(30) Foreign Application Priority Data

Dec. 26, 2013 (JP) ................................. 2013-270312

(51) Int. Cl.
| | | |
|---|---|---|
| *C08J 5/04* | (2006.01) | |
| *C08G 61/08* | (2006.01) | |
| *C08F 283/14* | (2006.01) | |
| *C08L 65/00* | (2006.01) | |
| *C08J 5/24* | (2006.01) | |

(52) U.S. Cl.
CPC ............ *C08J 5/043* (2013.01); *C08F 283/14* (2013.01); *C08G 61/08* (2013.01); *C08J 5/24* (2013.01); *C08L 65/00* (2013.01); *C08G 2261/418* (2013.01); *C08J 2323/18* (2013.01); *C08J 2323/20* (2013.01); *C08J 2345/00* (2013.01)

(58) Field of Classification Search
CPC ........ C08J 5/043; C08J 5/24; C08G 2261/418
See application file for complete search history.

(56) References Cited

U.S. PATENT DOCUMENTS

| | | |
|---|---|---|
| 2006/0211834 A1 | 9/2006 | Sugawara |
| 2011/0237718 A1* | 9/2011 | Yoshiwara ............ C08F 283/14 524/114 |
| 2012/0088879 A1 | 4/2012 | Yoshiwara |

FOREIGN PATENT DOCUMENTS

| | | |
|---|---|---|
| JP | 2004-175641 A | 6/2004 |
| JP | 2004-244609 A | 9/2004 |
| WO | 2008/114867 A1 | 9/2008 |
| WO | 2010/044461 A1 | 4/2010 |
| WO | 2010/147116 A1 | 12/2010 |

OTHER PUBLICATIONS

Extended (supplementary) European Search Report dated Jun. 8, 2017, issued in counterpart European Patent Application No. 14875625.7. (8 pages).
International Search Report dated Mar. 17, 2015, issued in counterpart International Application No. PCT/JP2014/083362 (2 pages).
Translation of Written Opinion dated Mar. 13, 2015, issued in counterpart Application No. PCT/JP2014/083362. (5 pages).
Office Action dated Feb. 18, 2019, issued in counterpart EP application No. 14 875 625.7.(3 pages).

* cited by examiner

*Primary Examiner* — Wenwen Cai
(74) *Attorney, Agent, or Firm* — Westerman, Hattori, Daniels & Adrian, LLP

(57) ABSTRACT

The present invention relates to a method for producing a composite molded article having a flexural modulus at 150° C. of 25% or more of a flexural modulus at 23° C., including the steps of (1) placing glass fibers in a mold; (2) impregnating glass fibers with a polymerizable composition containing a cycloolefin monomer, a metathesis polymerization catalyst, a radical generator, and a compound represented by the general formula (I); (3) subjecting the above polymerizable composition with which the glass fibers are impregnated to a bulk polymerization to provide a composite molded article; and (4) demolding the composite molded article; and a composite molded article obtained by the above method. According to the method of the present invention, a composite molded article containing glass fibers, the composite molded article having excellent mechanical strength can be produced.

2 Claims, No Drawings

METHOD FOR PRODUCING COMPOSITE MOLDED ARTICLE

TECHNICAL FIELD

The present invention relates to a method for producing a composite molded article containing glass fibers and a composite molded article obtained by the production method.

BACKGROUND ART

So far, crosslinked resin molded articles having excellent mechanical strength using carbon fibers as reinforcing fibers have been known (Patent Publication 1 and Patent Publication 2). However, there were yet some rooms of improvements for composite molded articles containing glass fibers in mechanical strength, especially flexural strength.

PRIOR ART REFERENCES

Patent Publications

Patent Publication 1: WO/2010/1044461
Patent Publication 2: WO/2010/147116

SUMMARY OF THE INVENTION

Problems to be Solved by the Invention

Accordingly, an object of the present invention is to provide a method for producing a composite molded article containing glass fibers, the composite molded article having excellent mechanical strength, and the composite molded article.

Means to Solve the Problems

Specifically, the gist of the present invention relates to:
[1] a method for producing a composite molded article having a flexural modulus at 150° C. of 25% or more of a flexural modulus at 23° C., including the steps of:
(1) placing glass fibers in a mold;
(2) impregnating glass fibers with a polymerizable composition containing a cycloolefin monomer, a metathesis polymerization catalyst, a radical generator, and a compound represented by the following general formula (I):

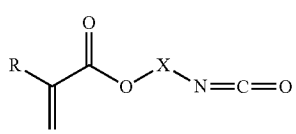

wherein R is an alkyl group having from 1 to 6 carbon atoms, and X is a divalent organic group;
(3) subjecting the above polymerizable composition with which the glass fibers are impregnated to a bulk polymerization to provide a composite molded article; and
(4) demolding the composite molded article; and

[2] a composite molded article obtained by the method as defined in the above [1].

Effects of the Invention

According to the method of the present invention, a composite molded article containing glass fibers, the composite molded article having excellent mechanical strength can be produced.

MODES FOR CARRYING OUT THE INVENTION

The composite molded article of the present invention (which may hereinafter be simply referred to as "molded article") is a molded article made of cycloolefin-based resin obtained by subjecting a polymerizable monomer containing a cycloolefin monomer to a bulk polymerization in a mold, and one of the features is in that the composite molded article contains glass fibers. The molded article of the present invention has a flexural modulus at 150° C. of 25% or more of a flexural modulus at 23° C., showing excellent property in mechanical strength.

The above molded article of the present invention can be produced by the method of the present invention. The method of the present invention is a method including the steps of:
(1) placing glass fibers in a mold;
(2) impregnating the glass fibers with a polymerizable composition containing a cycloolefin monomer, a metathesis polymerization catalyst, a radical generator, and a compound represented by the above general formula (I);
(3) subjecting the above polymerizable composition with which the glass fibers are impregnated to a bulk polymerization to provide a composite molded article; and
(4) demolding the composite molded article.

Polymerizable Composition

The polymerizable composition usable in the method of the present invention is prepared by properly mixing a cycloolefin monomer, a metathesis polymerization catalyst, a radical generator, and a compound represented by the above general formula (I), and optional components to be blended as needed, in accordance with a known method.

The above optional components include activators, activity regulators, elastomers, antioxidants, and the like.

First, each of the components contained in the polymerizable composition will be explained.

Cycloolefin Monomer

The cycloolefin monomer is a compound having an alicyclic structure and a carbon-carbon double bond within the molecule.

The alicyclic structure constituting the cycloolefin monomer includes monocyclic, polycyclic, condensed polycyclic, bridged ring, and combination polycyclic thereof, and the like. The carbon number constituting the alicyclic structure is not particularly limited, but usually the number is 4 to 30, preferably 5 to 20 and more preferably 5 to 15.

The cycloolefin monomer may include mono cycloolefin monomer, norbornene-based monomer and the like. The norbornene-based monomer is preferred. The norbornene-based monomer is a cycloolefin monomer having a norbornene ring structure within a molecule, which may be substituted by hydrocarbon group including alkyl group, alkenyl group, alkylidene group and aryl group or polar group. Furthermore, the norbornene-based monomer may include other double bonds besides the double bond of norbornene-ring.

The mono cycloolefin monomer may include cyclobutene, cyclopentene, cyclooctene, cyclododecene, cyclopentadiene, 1,5-cyclooctadiene and the like.

Specific examples of the norbornene-based monomer include:

dicyclopentadienes such as dicyclopentadiene, methyldicyclopentadiene and the like;

tetracyclododecenes such as tetracyclo[6.2.1.1$^{3,6}$.0$^{2,7}$]dodec-4-ene, 9-ethylidenetetracyclo[6.2.1.1$^{3,6}$.0$^{2,7}$]dodec-4-ene, 9-phenyltetracyclo[6.2.1.1$^{3,6}$.0$^{2,7}$]dodec-4-ene, tetracyclo[6.2.1.1$^{3,6}$.0$^{2,7}$]dodec-9-en-4-carboxylate, tetracyclo[6,2.1.1$^{3,6}$.0$^{2,7}$]dodec-9-en-4,5-dicarboxylic anhydride and the like;

norbornenes such as 2-norbornene, 5-ethylidene-2-norbornene, 5-vinyl-2-norbornene, 5-phenyl-2-norbornene, 5-norbornen-2-yl acrylate, 5-norbornen-2-yl methacrylate, 5-norbornene-2-carboxylate, 5-norbornene-2,3-dicarboxylate, 5-norbornene-2,3-dicarboxylic anhydride and the like;

oxanorbornenes such as 7-oxa-2-norbornene, 5-ethylidene-7-oxa-2-norbornene and the like;

tetra or higher polycycloolefins such as tetracyclo[9.2.1.0$^{2,10}$.0$^{3,8}$]tetradeca-3,5,7,12-tetraene (also called 1,4-methano-1,4,4a,9a-tetrahydro-9H-florene), pentacyclo[6.5.1.1$^{3,6}$.0$^{2,7}$.0$^{9,13}$]pentadeca-4,10-diene, pentacyclo[9.2.1.0$^{2,10}$.0$^{3,8}$]pentadeca-5,12-diene, tricyclopentadiene and the like.

Among these cycloolefin monomers, the cycloolefin without having a polar group is preferred because a low-water-absorbable molded article can be obtained. In addition, when a cycloolefin having an aromatic condensed ring such as tetracyclo[9.2.1.0$^{2,10}$.0$^{3,8}$]tetradeca-3,5,7,12-tetraene is used, the viscosity of the polymerizable composition is lowered.

These cycloolefin monomers may be used alone or may be used in a combination of two or more kinds. By using the combination, the physical properties of the cycloolefin-based resin obtained can be appropriately adjusted.

Here, the polymerizable composition used in the present invention may contain an optional monomer which is copolymerizable with the above-mentioned cycloolefin monomer, so long as the exhibition of the effects of the present invention is not impaired.

Metathesis Polymerization Catalyst

The metathesis polymerization catalyst usable in the method of the present invention is not particularly limited, so long as the cycloolefin monomer can be subjected to ring-opening polymerization, and a known one can be used.

The metathesis polymerization catalyst usable in the present invention is a complex composed of a transition metal atom as a center atom and plural ions, atoms, multiatomic ions, and/or compounds bound thereto. As the transition metal atom, the atoms of Groups 5, 6 and 8 (Long-period type Periodic Table, hereinafter referred to the same) are used. Although the atoms of each of the Groups are not particularly limited, the atoms of Group 5 include, for example, tantalum, the atoms of Group 6 include, for example, molybdenum and tungsten, and the atoms of Group 8 include, for example, ruthenium and osmium. Among these transition metal atoms, ruthenium and osmium of Group 8 are preferred. In other words, the metathesis polymerization catalyst used in the present invention is preferably a complex with ruthenium or osmium as a center atom, and more preferably a complex with ruthenium as a center atom. As the complex with ruthenium as a center atom, a ruthenium-carbene complex composed of ruthenium and carbene compounds coordinated thereto is preferred. Here, the term "carbene compound" collectively refers to compounds having a methylene free radical, which are compounds having a divalent carbon atom (carbene carbon) that is not electrically charged, as represented by (>C:). Since the ruthenium-carbene complex has excellent catalytic activity upon the bulk ring-opening polymerization, the polymer obtained has less odor originated from unreacted monomers, so that a high-quality polymer is obtained with excellent productivity. In addition, the complex is relatively stable against oxygen or water in the air, and is less likely to be deactivated, so that the complex can be used in the air. The metathesis polymerization catalyst is used alone or in a combination of two or more kinds.

The ruthenium-carbene complex includes a complex represented by the following general formula (1) or general formula (2).

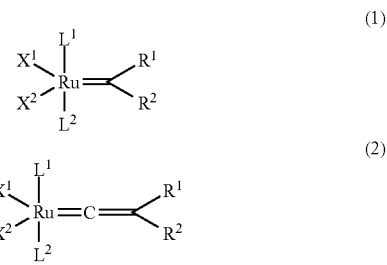

In the above general formulas (1) and (2), each of $R^1$ and $R^2$ is independently a hydrogen atom; a halogen atom; or an organic group having from 1 to 20 carbon atoms, which may contain a halogen atom, an oxygen atom, a nitrogen atom, a sulfur atom, a phosphorus atom or a silicon atom, and these groups may have a substituent, or may be bound to each other to form a ring. Examples of $R^1$ and $R^2$ that are bound to each other to form a ring include an indenylidene group which may have a substituent such as a phenylindenylidene group.

Specific examples of the organic group having from 1 to 20 carbon atoms which may contain a halogen atom, an oxygen atom, a nitrogen atom, a sulfur atom, a phosphorus atom, or a silicon atom include an alkyl group having from 1 to 20 carbon atoms, an alkenyl group having from 2 to 20 carbon atoms, an alkynyl group having from 2 to 20 carbon atoms, an alyl group having from 6 to 20 carbon atoms, an alkoxy group having from 1 to 20 carbon atoms, an alkenyloxy group having from 2 to 20 carbon atoms, an alkynyloxy group having from 2 to 20 carbon atoms, an aryloxy group having from 6 to 20 carbon atoms, an alkylthio group having from 1 to 8 carbon atoms, a carbonyloxy group, an alkoxycarbonyl group having from 1 to 20 carbon atoms, an alkylsulfonyl group having from 1 to 20 carbon atoms, an alkylsulfinyl group having from 1 to 20 carbon atoms, an alkylsulfonic acid group having from 1 to 20 carbon atoms, an arylsulfonic acid group having from 6 to 20 carbon atoms, a phosphonic acid group, an arylphosphonic acid group having from 6 to 20 carbon atoms, an alkylammonium group having from 1 to 20 carbon atoms, and an arylammonium group having from 6 to 20 carbon atoms, and the like. These organic groups having from 1 to 20 carbon atoms which may contain a halogen atom, an oxygen atom, a nitrogen atom, a sulfur atom, a phosphorus atom, or a silicon atom may have a substituent. Examples of the substituent include an alkyl group having from 1 to 10 carbon atoms, an alkoxy group having from 1 to 10 carbon atoms, and an aryl group having from 6 to 10 carbon atoms, and the like.

Each of $X^1$ and $X^2$ is independently any anionic ligand. The anionic ligand refers to a ligand having a negative electric charge when separated from a center metal atom, and includes, for example, a halogen atom, a diketonate group, a substituted cyclopentadienyl group, an alkoxyl group, an aryloxy group, a carboxyl group, and the like.

$L^1$ and $L^2$ stand for a heteroatom-containing carbene compound or a neutral electron donating compound other than the heteroatom-containing carbene compound. The heteroatom-containing carbene compound and the neutral electron donating compound other than the heteroatom-containing carbene compound are compounds having neutral electric charges when separated from the center metal. The heteroatom containing-carbene compound is preferred, from the viewpoint of improving catalytic activity. The heteroatom means atoms of Groups 15 and 16 of the Periodic Table, and specific examples include a nitrogen atom, an oxygen atom, a phosphorus atom, a sulfur atom, an arsenic atom, a selenium atom, and the like. Among them, a nitrogen atom, an oxygen atom, a phosphorus atom, and a sulfur atom are preferred, and a nitrogen atom is especially preferred, from the viewpoint of obtaining a stable carbene compound.

As the above heteroatom-containing carbene compound, a compound represented by the following general formula (3) or (4) is preferred, and the compound represented by the following general formula (3) is especially preferred, from the viewpoint of improving catalytic activity.

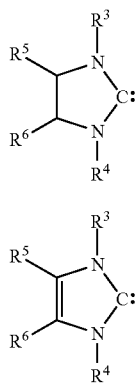

In the above general formulas (3) and (4), each of $R^3$, $R^4$, $R^5$ and $R^6$ stands for independently a hydrogen atom; a halogen atom; or an organic group having from 1 to 20 carbon atoms which may have a halogen atom, an oxygen atom, a nitrogen atom, a sulfur atom, a phosphorus atom, or a silicon atom. Specific examples of the organic group having from 1 to 20 carbon atoms which may have a halogen atom, an oxygen atom, a nitrogen atom, a sulfur atom, a phosphorus atom, or a silicon atom are the same as those cases for the above general formulas (1) and (2).

Alternatively, $R^3$, $R^4$, $R^5$ and $R^6$ may be bound to each other in any combinations to form a ring.

Here, in order to make the effects of the present invention more remarkable, it is preferable that $R^5$ and $R^6$ are hydrogen atoms. In addition, $R^3$ and $R^4$ are preferably aryl groups which may have a substituent, and the substituent is more preferably a phenyl group having an alkyl group having from 1 to 10 carbon atoms, and especially preferably a mesityl group.

The above neutral electron donating compound includes, for example, an oxygen atom, water, carbonyls, ethers, nitriles, esters, phosphines, phosphinites, phosphites, sulfoxides, thioethers, amides, imines, aromatics, cyclic diolefins, olefins, isocyanides, and thiocyanates, and the like.

In the above general formula (1) and (2), each of $R^1$, $R^2$, $X^1$, $X^2$, $L^1$ and $L^2$ may be bound solely to form a polydentate chelating ligand, and/or bound to each other in any combinations to form a polydentate chelating ligand.

In addition, as the ruthenium-carbene complex used in the present invention, among the compounds represented by the above general formula (1) or (2), the compound represented by the above general formula (1) is preferred, from the viewpoint of making the effects of the present invention more remarkable. Among them, a compound represented by the general formula (5) or the general formula (6) given below is more preferred.

The general formula (5) is given hereinbelow.

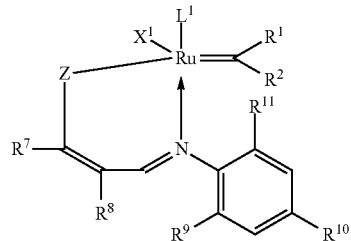

In the above general formula (5), Z is an oxygen atom, a sulfur atom, a selenium atom, $NR^{12}$, $PR^{12}$ or $AsR^{12}$, wherein $R^{12}$ is a hydrogen atom; a halogen atom; or an organic group having from 1 to 20 carbon atoms which may contain a halogen atom, an oxygen atom, a nitrogen atom, a sulfur atom, a phosphorus atom, or a silicon atom. Since the effects of the present invention are even more remarkable, it is preferable that Z is an oxygen atom.

Here, $R^1$, $R^2$, $X^1$ and $L^1$ are the same as defined in the cases of the above general formulas (1) and (2), which may be bound solely to form a polydentate chelating ligand and/or may be bound to each other in any combinations to form a polydentate chelating ligand, and it is preferable that $X^1$ and $L^1$ do not form a polydentate chelating ligand, and that $R^1$ and $R^2$ are bound to each other to form a ring, more preferably an indenylidene group which may have a substituent, and especially preferably a phenylindenylidene group.

In addition, specific examples of the organic group having from 1 to 20 carbon atoms which may contain a halogen atom, an oxygen atom, a nitrogen atom, a sulfur atom, a phosphorus atom, or a silicon atom are the same as the cases of the above general formulas (1) and (2).

In the above general formula (5), each of $R^7$ and $R^8$ is independently a hydrogen atom, an alkyl group having from 1 to 20 carbon atoms, an alkenyl group having from 2 to 20 carbon atoms, or a heteroaryl group having from 6 to 20 carbon atoms, and these groups may have a substituent, or may be bound to each other to form a ring. Examples of the substituent include an alkyl group having from 1 to 10 carbon atoms, an alkoxy group having from 1 to 10 carbon atoms, or an aryl group having from 6 to 10 carbon atoms. The ring when a ring is formed may be any of aromatic rings, alicyclic rings, and heterocyclic rings. It is preferable that an aromatic ring is formed, it is more preferable that an aromatic ring having from 6 to 20 carbon atoms is formed, and it is even more preferable that an aromatic ring having 6 to 10 carbon atoms is formed.

In the above general formula (5), each of $R^9$, $R^{10}$, and $R^{11}$ is independently a hydrogen atom; a halogen atom; or an organic group having from 1 to 20 carbon atoms which may contain a halogen atom, an oxygen atom, a nitrogen atom, a sulfur atom, a phosphorus atom, or a silicon atom, and these groups may have a substituent, or may be bound to each other to form a ring. In addition, specific examples of the organic group having from 1 to 20 carbon atoms which may contain a halogen atom, an oxygen atom, a nitrogen atom, a sulfur atom, a phosphorus atom, or a silicon atom are the same as the cases of the above general formulas (1) and (2).

It is preferable that $R^9$, $R^{10}$ and $R^{11}$ are a hydrogen atom or an alkyl group having from 1 to 20 carbon atoms, and especially preferably a hydrogen atom or an alkyl group having from 1 to 3 carbon atoms.

Here, specific examples of the compound represented by the above general formula (5) and production methods thereof include those described in, for example, WO 03/062253 (Japanese Unexamined Patent Publication No. 2005-515260), and the like.

The general formula (6) is given hereinbelow.

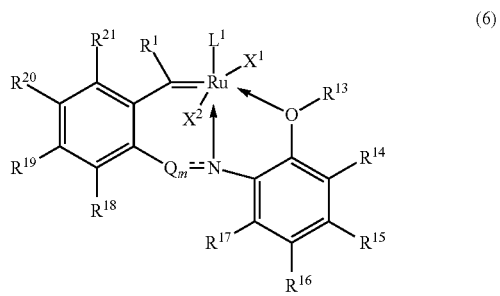

(6)

In the above general formula (6), m is 0 or 1. m is preferably 1, and in that case Q is an oxygen atom, a nitrogen atom, a sulfur atom, a methylene group, an ethylene group, or a carbonyl group, and preferably a methylene group.

--- is a single bond or a double bond, and preferably a single bond.

$R^1$, $X^1$, $X^2$ and $L^1$ are the same as the cases of the above general formulas (1) and (2), each of which may be bound solely to form a polydentate chelating ligand and/or may be bound to each other in any combinations to form a polydentate chelating ligand. It is preferable that $X^1$, $X^2$ and $L^1$ do not form a polydentate chelating ligand, and that $R^1$ is a hydrogen atom.

$R^{13}$ to $R^{21}$ are a hydrogen atom; a halogen atom; or an organic group having from 1 to 20 carbon atoms which may contain a halogen atom, an oxygen atom, a nitrogen atom, a sulfur atom, a phosphorus atom, or a silicon atom, and these groups may have a substituent, or may be bound to each other to form a ring. In addition, specific examples of the organic group having from 1 to 20 carbon atoms which may contain a halogen atom, an oxygen atom, a nitrogen atom, a sulfur atom, a phosphorus atom, or a silicon atom are the same as the cases of the above general formulas (1) and (2).

$R^{13}$ is preferably an alkyl group having from 1 to 20 carbon atoms, and more preferably an alkyl group having from 1 to 3 carbon atoms, $R^{14}$ to $R^{17}$ are preferably a hydrogen atom, and $R^{18}$ to $R^{21}$ are preferably a hydrogen atom or a halogen atom.

Here, specific examples of the compound represented by the above general formula (6) and production methods thereof include those described in, for example, WO 11/079799 (Japanese Unexamined Patent Publication No. 2013-516392), and the like.

In addition, as the above compound represented by the general formula (1), in addition to the above compound represented by the general formula (5) or the general formula (6), the following compound (7) can be preferably used. In the compound (7), $PCy_3$ is tricyclohexylphosphine and Mes is a mesityl group.

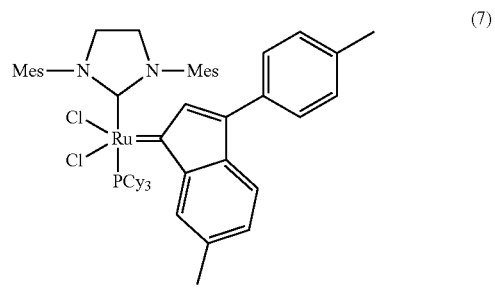

(7)

The amount of the metathesis polymerization catalyst used is preferably 0.01 mmol or more, more preferably 0.1 to 50 mmol, and even more preferably 0.1 to 20 mmol, per one mol of the entire monomers used in the reaction.

Radical Generator

The radical generator has an action of generating radical with heating, thereby inducing a crosslinking reaction in the cycloolefin-based resin. A site at which a crosslinking reaction is induced by the radical generator is primarily a carbon-carbon double bond of the cycloolefin-based resin, and a crosslinking reaction may take place even at a saturated bond portion.

The radical generator includes organic peroxides, diazo compounds and nonpolar radical generators. The organic peroxide includes, for example, hydroperoxides such as t-butyl hydroperoxide, p-menthanehydroperoxide and cumene hydroperoxide; dialkyl peroxides such as di-t-butyl peroxide, dicumyl peroxide and t-butyl cumyl peroxide; diacyl peroxides such as dipropionyl peroxide and benzoyl peroxide; peroxyketals such as 2,5-dimethyl-2,5-di(t-butylperoxy)hexane, 2,5-dimethyl-2,5-di(t-butylperoxy)-3-hexyne, 1,3-di(t-butylperoxyisopropyl)benzene; peroxyesters: such as t-butyl peroxyacetate and t-butyl peroxybenzoate; peroxy carbonates such as t-butyl peroxy isopropylcarbonate and di(isopropylperoxy)dicarbonate; alkylsilyl peroxides such as t-butyl trimethylsilyl peroxide; and the like. Among them, the dialkyl peroxide is preferred, especially from the aspect that the impediment to the metathesis polymerization reaction in bulk polymerization is small.

Examples of the diazo compound include, for example, 4,4'-bisazidobenzal(4-methyl)cyclohexanone, 4,4'-diazidochalcone, 2,6-bis(4'-azidobenzal)cyclohexanone, 2,6-bis(4'-azidobenzal)-4-methylcyclohexanone, 4,4'-diazidodiphenylsulfone, 4,4'-diazidodiphenylmethane, 2,2'-diazidostilbene and the like.

Examples of the nonpolar radical generator include 2,3-dimethyl-2,3-diphenylbutane, 2,3-diphenylbutane, 1,4-diphenylbutane, 3,4-dimethyl-3,4-diphenylhexane, 1,1,2,2-tetraphenylethane, 2,2,3,3,-tetraphenylbutane, 3,3,4,4-tetraphenylhexane, 1,1,2-triphenylpropane, 1,1,2-triphenylethane, triphenylmethane, 1,1,1-triphenylethane, 1,1,1-triphenylpropane, 1,1,1-triphenylbutane, 1,1,1-triphenylpentane. 1,1,1-triphenyl-2-propene, 1,1,1-triphenyl-4-pentene, 1,1,1-triphenyl-2-phenylethane and the like.

The amount of the radical generator in the polymerizable composition is usually from 0.1 to 10 parts by mass, and preferably from 0.5 to 5 parts by mass, based on 100 parts by mass of all the monomers used. When the amount of the radical generator is too small, a crosslinking reaction would be insufficient, thereby lowering flexural strength of the molded article. On the other hand, when the amount of the radical generator is too large, a crosslinking reaction would be carried out in excess, thereby making the molded article likely to be brittle.

Compound Represented by the General Formula (I)

The compound represented by the above general formula (I) usable in the present invention is assumed to function as a contact improving agent or a contact enhancing agent for the cycloolefin-based resin and the glass fibers in the molded article obtained.

It is assumed that in addition to firm binding of the compound represented by the general formula (I) defined above by physical and/or chemical bonding between the cycloolefin-based resin and the glass fibers or, sizing agent deposited to the glass fibers), wettability of the polymerizable composition containing a cycloolefin monomer against the glass fibers is also improved, and homogeneous impregnation of the polymerizable composition to the glass fibers would be promoted.

In the above general formula (I), R is an alkyl group having from 1 to 6 carbon atoms, and the number of carbon atoms of the alkyl group is from 1 to 3. The alkyl group may be linear or branched. Specific examples of R include a methyl group, an ethyl group, and an isobutyl group, and the like. In the above general formula (I), the divalent organic group for X includes, for example, alkylene groups having from 1 to 3 carbon atoms, such as a methylene group or an ethylene group, and cycloalkylene groups having from 6 to 10 carbon atoms such as a 1,4-cyclohexylene group.

Specific examples of the compound represented by the general formula (I) defined above include isocyanatomethyl methacrylate, 2-isocyanatoethyl methacrylate, and 2-isocyanatopropyl methacrylate, and the like.

The compound represented by the general formula (I) defined above may be used alone or in a combination of two or more kinds. It is preferable that the blending amount of the compound represented by the general formula (I) defined above is usually from 0.5 to 20 parts by mass, preferably from 1 to 15 parts by mass, and more preferably from 2 to 10 parts by mass, based on 100 parts by mass of the all the monomers used. If the blending amount is within this range, the wettability of the glass fibers to the polymerizable composition is favorable, so that the contact between the cycloolefin-based resin and the glass fibers would be excellent, thereby making it advantageous in costs.

Further in the present invention, it is preferable to use a compound represented by the following general formula (II):

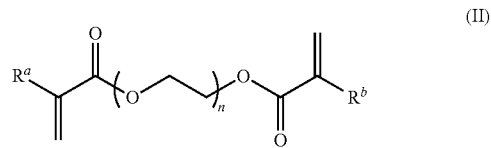

or a compound represented by the following general formula (III):

together with the compound represented by the general formula (I) defined above, from the viewpoint of increasing contact of the glass fibers, thereby improving mechanical strength of the molded article obtained. By using the above compound together with the compound represented by the general formula (I) defined above, it is assumed that the function as a contact improving agent or a contact enhancing agent of the compound represented by the general formula (I) defined above is increased synergistically.

In the above general formula (II), $R^a$ and $R^b$ are the same as R of the general formula (I), and preferred embodiments thereof and the like are also the same. n is an integer of from 1 to 5, and preferably from 1 to 3.

In the above general formula (III), each of $R^c$ to $R^f$ may be identical or different, and at least two of those are a group represented by the following general formula (IV):

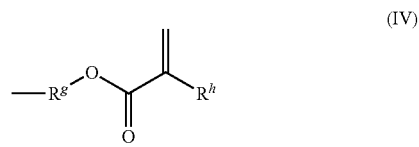

and the remaining is a hydrogen atom of an alkyl group having from 1 to 6 carbon atoms. The alkyl group has preferably from 1 to 3 carbon atoms, which may be linear or branched. Specific examples of the alkyl group include a methyl group, an ethyl group, and an isobutyl group, and the like.

In the above general formula (IV), $R^g$ is an alkylene group or oxyalkylene group having from 1 to 6 carbon atoms, and preferably from 1 to 3 carbon atoms. Specific examples of $R^g$ include a methylene group, an ethylene group, an isobutylene group, and an oxyethylene group, and the like. $R^h$ is an alkyl group having from 1 to 6 carbon atoms, and preferably from 1 to 3 carbon atoms. The alkyl group may be linear or branched. Specific examples of $R^h$ include a methyl group, an ethyl group, and an isobutyl group, and the like.

Specific examples of the compound represented by the general formula (II) or (III) defined above include polyfunctional acrylate compounds such as ethylene glycol dimethacrylate, triethylene glycol dimethacrylate, trimethylolpropane trimethacrylate, and neopentyl glycol dimethacrylate.

The compound represented by the general formula (II) or (III) defined above may be used alone or in a combination of two or more kinds. The blending amount of those compounds is usually from 0.5 to 20 parts by mass, preferably from 1 to 15 parts by mass, and more preferably from 2 to 10 parts by mass, based on 100 parts by mass of the all the monomers used. If the blending amount falls in this range, it is preferable because the function of the compound represented by the general formula (I) defined above as a contact improving agent or a contact enhancing agent would be increased synergistically, so that the contact of the cycloolefin-based resin and the glass fibers would be excellent.

Optional Components

The polymerizable composition used in the present invention may contain an optional component including, for example, an activator, an activity regulator, an elastomer, or an antioxidant.

The activator is a compound that acts as a cocatalyst of the metathesis polymerization catalyst mentioned above to improve polymerization activity of the catalyst. As an activator, for example, an alkylaluminum halide such as ethyl aluminum dichloride or diethyl aluminum chloride; an alkoxyalkylaluminum halide a part of alkyl groups of which is substituted with an alkoxy group; an organic tin compound; or the like may be used. The amount of the activator used is usually, but not particularly limited to, preferably from 0.1 to 100 mol, and more preferably from 1 to 10 mol, based on 1 mol of all the metathesis polymerization catalysts.

The activity regulator is used for preventing the polymerization to begin during the course of injecting, upon mixing two or more reactive stock solutions to prepare a polymerizable composition and injecting the composition in a mold to begin the polymerization.

An activity regulator when using a compound of a transition metal of Group 5 or Group 6 in the Periodic Table as a metathesis polymerization catalyst includes compounds having an effect to reduce the metathesis polymerization catalyst, etc., and alcohols, halo alcohols, esters, ethers, nitriles, etc. can be used. Among them, alcohols and halo alcohols are preferable, and halo alcohols are particularly preferable.

Specific examples of alcohols include n-propanol, n-butanol, n-hexanol, 2-butanol, isobutyl alcohol, isopropyl alcohol, t-butyl alcohol and the like. Specific examples of halo alcohols include 1,3-dichloro-2-propanol, 2-chloroethanol, 1-chlorobutanol and the like.

An activity regulator when a ruthenium-carbene complex is used as a metathesis polymerization catalyst includes Lewis base compounds. A Lewis base compound includes, for example, Lewis base compounds having a phosphorous atom such as tricyclopentyl phosphine, tricyclohexyl phosphine, triphenyl phosphine, triphenyl phosphite, n-butyl phosphine and the like; and Lewis base compound having a nitrogen atom such as n-butylamine, pyridine, 4-vinylpyridine, acetonitrile, ethylenediamine, N-benzylidene methylamine, pyrazine, piperidine, imidazole and the like. Also, norbornenes substituted by an alkenyl group such as vinylnorbornene, propenylnorbornene and isopropenyinorbornene act as not only the above cycloolefin monomer, but also as an activity regulator. The amount of these active regulators used may be properly adjusted depending upon the compounds used.

An elastomer includes, for example, natural rubber, polybutadiene, polyisoprene, styrene-butadiene copolymer (SBR), styrene-butadiene-styrene block copolymer (SBS), styrene-isoprene-styrene copolymer (SIS), ethylene-propylene-diene terpolymer (EPDM), ethylene-vinyl acetate copolymer (EVA) and hydrogenated products of these, etc. By using an elastomer to be dissolved in the polymerizable composition, the viscosity thereof can be controlled. Also, by adding an elastomer, the impact resistance of the molded article obtained can be improved. The amount of the elastomer is preferably 0.5 to 20 parts by mass and more preferably 2 to 10 parts by mass with respect to 100 parts by mass of the entire monomer in the polymerizable composition.

The antioxidant includes various antioxidants for plastics and rubbers such as phenolic, phosphorus-based and amine-based antioxidants.

Preparation of Polymerizable Composition

The polymerizable composition in the present invention is prepared by properly mixing each of the components mentioned above in accordance with a known method, or the polymerizable composition may be prepared by mixing two or more reactive stock solutions immediately before the reaction. The reactive stock solutions are prepared in such a manner that each of the components mentioned above are divided into two or more solutions so that the stock solutions do not undergo bulk solution with a single solution, but form a polymerizable composition containing each of the components in a given ratio when all the solutions are mixed. A combination of the two or more reactive stock solutions includes the following two types, (a) and (b), according to the kinds of the metathesis polymerization catalyst used.

(a): As the above metathesis polymerization catalyst, those having polymerization activity when used together with an activator, but not when used alone, can be used. In this case, a reactive stock solution (A) including a cycloolefin monomer and an activator and another reactive stock solution (B) including a cycloolefin monomer and a metathesis polymerization catalyst can be used, and mixed to obtain a polymerizable composition. Further, a reactive stock solution (liquid C) including a cycloolefin monomer and none of a metathesis polymerization catalyst and an activator can be used together.

(b): Also, when using a metathesis polymerization catalyst having polymerization activity alone, by mixing a reactive stock solution (i) including a cycloolefin monomer and a reactive stock solution (ii) including metathesis polymerization catalyst, the polymerizable composition can be obtained. As the reactive stock solution (ii) in this case, a metathesis polymerization catalyst is usually used by dissolving or dispersing in a small amount of an inactive solvent. Examples of the solvent include, for example, aromatic hydrocarbons such as toluene, xylene, ethylbenzene, and trimethylbenzene; ketones such as methyl ethyl ketone, cyclopentanone, cyclohexanone, 2-heptanone, and 4-hydroxy-4-methyl-2-pentanone; cyclic ethers such as tetrahydrofuran; diethyl ether, dichloromethane, dimethyl sulfoxide, ethyl acetate and the like. Among them, the aromatic hydrocarbons are preferred, and toluene is especially preferred.

The above radical generator, the above compounds represented by the general formulas (I) to (III), and the above optional components may be contained in any of the above reactive stock solutions, or they may be added in the form of a liquid mixture other than the above reactive stock solutions.

As described later, the method for production of the present invention can be carried out by applying a known resin molding method. It is preferable that the mixing of the above reactive stock solutions is carried out by selecting and using an appropriate mixer according to the resin molding method to be applied. The mixer includes, for example, collision mixers generally used in reaction injection-molding methods, and low-pressure mixers such as dynamic mixers and static mixers, and the like. If reactive stock solutions are introduced into those mixers, components are immediately mixed to form a polymerizable composition. In the resin molding method described later, a polymerizable composition would be directly injected into a mold.

Method for Producing Composite Molded Article

The method for production of the present invention can be appropriately carried out by applying a known resin molding method in accordance with the shape of the desired molded article, The resin molding method include, for example, reaction injection molding method (RIM method), resin transfer molding method (RTM method) and infusion molding method.

In the step (1), glass fibers are placed in a mold.

Glass Fibers

The glass fibers used in the present invention are not particularly limited, and include, for example, those in the forms of continuous fibers, woven fabrics and nonwoven fabrics, and the like, and those having various thicknesses are available as commercial products. The forms and the thickness of the glass fibers can be properly selected according to the applications of the molded articles obtained.

The basis weight of the glass fibers used in the present invention is properly selected depending upon the use and purposes, and is preferably 600 g/m² or more, more preferably from 600 to 2,000 g/m², and even more preferably from 640 to 1,800 g/m². When the basis weight of the glass fibers is too small, some spaces are created among the neighboring glass fibers, so that the mechanical strength of the molded article obtained would be insufficient. On the other hand, when the basis weight is exceedingly large, the parts overlaying with the neighboring glass fibers themselves would be created, so that the impregnating property of the polymerizable composition is likely to be impaired.

It is preferable that the glass fibers are subjected to hydrophobic treatment on their surface. By using the hydrophobically treated glass fibers, the glass fibers can be homogeneously dispersed in the molded article obtained, so that rigidity and dimensional stability of the molded article can be made even, and further that isotropy can be made smaller. The treatment agent usable in the hydrophobic treatment includes silane coupling agents, titanate coupling agents, aluminum coupling agents, fatty acids, fats and oils, surfactants, waxes, and other polymers, and the like. These treatment agents can also serve as a sizing agent.

Mold

The mold to be used may be appropriately selected according to the applied resin molding method taking the shape of the desired molded article into consideration. In the method of the present invention, since reactive stock solutions having low viscosities are used and molding can be carried out at a relatively low temperature and a relatively low pressure, the mold used in molding is not necessarily required to be an expensive mold having high rigidity. The mold is not limited to a metallic mold, and a mold made of a resin or a simple mold frame can be used.

The glass fibers may be appropriately placed in a selected mold according to an applicable resin molding method in a suitable manner for carrying out the method [the step (1)]. Prior to carrying out the step (2), the internal of the mold may be replaced with an inert gas such as nitrogen gas, or the internal may be subjected to a reduced pressure.

In the step (2), the glass fibers placed in the mold are impregnated with a given polymerizable composition.

RIM Method

In this method, the mold is not particularly limited, and the molds in the form of a split mold structure comprising a core mold and a cavity mold are usually used. The core mold and the cavity mold are prepared so that a cavity is formed in a shape matching the desired molded article. The glass fibers are placed in the cavity of the mold. The impregnation of the glass fibers with the polymerizable composition is carried out by injecting a polymerizable composition into a mold. The polymerizable composition used in the present invention has a low viscosity and excellent impregnating property to a substrate, so that the glass fibers can be homogeneously impregnated with the composition.

In the molding of two-liquid reactive resins according to an RIM method, the pressure at which raw materials (polymerizable composition) are injected into a mold during molding is from 1/30 to 1/500 that of the injection molding for injecting resins. For this reason, filling property into the mold is highly favorable, thereby making it possible to mold into diversified shapes. Since an injection pressure into the mold is very low, an internal pressure generated in the mold is also very low. Therefore, the strength required for the mold is dramatically reduced as compared to the mold used in injection molding, thereby facilitating the designing of the mold. Therefore, the designing of the mold for a large-scaled molded article is made easy, so that the development of the pipe members having a large aperture which is difficult to develop pipe members made of resins is made easy. In addition, there is a feature that the molding can be carried out in an ambient temperature region.

The filling pressure (injection pressure) upon filling the polymerizable composition in the cavity of the mold is usually from 0.01 to 10 MPa, and preferably from 0.02 to 5 MPa. In addition, the mold clamping pressure is usually within the range of from 0.01 to 10 MPa.

RTM Method

In the RTM (Resin Transfer Molding) method, a polymerizable composition is injected in a mold packed with glass fibers, and the glass fibers are impregnated with the composition.

In the molding according to an RTM method, in addition to the matter that a pressure generated is low in the same manner as in the RIM method, a mixing pressure would not be required as much as the RIM method upon mixing the reactive stock solutions, thereby making it possible to relatively simplify the mixing facilities. In addition, generally, the rate of polymerization is milder than that of the RIM method, thereby making it likely to be advantageous in the aspect of impregnation.

The filling pressure (injection pressure) upon filling the polymerizable composition in the cavity of the mold is usually from 0.01 to 10 MPa., and preferably from 0.02 to 5 MPa. In addition, the mold clamping pressure is usually within the range of from 0.01 to 10 MPa.

Infusion Molding Method

According to the infusion molding method, a polymerizable composition is filled in a mold at a vacuum pressure, i.e. 0.1 to 100 Pa or so, so that the glass fibers are impregnated. Specifically, in a state that glass fibers are placed on a mold, or optionally a mold releasing sheet and a resin diffusion material are placed thereon, the glass fibers are covered with an airproof film, and the air is sucked out of the airproof space to make in a reduced pressure state. In this reduced pressure state, a polymerizable composition is injected in the airproof space, and the glass fibers are impregnated with the polymerizable composition. This method is a molding method without soiling or odor, which is suitable in the molding of molded articles having high strength, such as large-scaled molded articles, and thick molded articles.

In the method of the present invention, in addition to the above methods, as an improved method, a light-resin transfer molding (L-RTM) molding method can also be applied. Basically, the molding method is a combination of an infusion molding method and an RTM method, wherein the mold comprises a concave-convex structure, comprising a concave mold in which glass fibers are placed, and a convex mold covering thereon, wherein pressure is reduced at the outer circumferential flange portion and a central portion of the mold. The mold clamping is carried by making the internal of the mold to vacuum, i.e. 0.1 to 100 Pa or so, and a polymerizable composition is injected from the outer circumference, and the glass fibers are impregnated with the composition. The excess polymerizable composition is detained at the pot at the center of the mold. The polymerizable composition would be in a state of pushing in from the outer circumference, so that the injection of the composition is carried out by pressure reduction and pressure raise. The filling pressure (injection pressure) upon filling the polymerizable composition in the cavity of the mold is usually from 0.01 to 10 MPa, and preferably from 0.02 to 5 MPa. In addition, the mold clamping pressure is usually within the range of from 0.01 to 10 MPa.

Other Impregnation Methods

As other impregnation methods, for example, a method including furnishing glass fibers in a dry state wound around an optional cylinder according to a filament winding method, and impregnating the glass fibers in a polymerizable composition to impregnate with the composition; a method including spraying a polymerizable composition to the glass fibers, and impregnating the glass fibers with the composition; a method including individually spraying individual reactive stock solution to the glass fibers in combination of the above reactive stock solutions, mixing the reactive stock solutions at the same time as spraying, and impregnating the glass fibers with the polymerizable composition; or the like can be used.

The quantitative relationship between the polymerizable composition to be impregnated in the glass fibers and the glass fibers is such that the glass fibers are preferably from 0.6 to 4 parts by mass, more preferably from 0.8 to 3 parts by mass, and even more preferably from 1 to 2 parts by mass, based on 1 part by mass of the polymerizable composition. If the relationship is within the above range, it is preferable because the flexural strength of the molded article obtained is excellently exhibited.

Here, the polymerizable composition may be injected or the like to a mold to allow the glass fibers to be impregnated, and maintained in that state for a given amount of time. It is preferable that the maintaining time is usually from 1 to 200 minutes or so. By maintaining in the manner as described above, the polymerizable composition can be sufficiently diffused to entire areas of the glass fibers.

In the step (3), the polymerizable composition impregnated with the glass fibers is subjected to a bulk polymerization to give a composite molded article.

The bulk polymerization is carried out by heating a mold into which a polymerizable composition is injected or the like. As the temperature during the bulk polymerization, in other words the mold temperature, the highest temperature is preferably 90° C. or higher and 300° C. or lower. The highest temperature is more preferably from 100° to 270° C., and even more preferably from 120° to 250° C. In addition, the lowest temperature during the bulk polymerization is preferably from 40° to 90° C., and more preferably from 50° to 85° C. The initiation temperature of the bulk polymerization is usually within the range of from 0° to 40° C., and preferably within the range of from 10° to 30° C. The bulk polymerization is carried out by injecting or the like a polymerizable composition in a mold, or introducing reactive stock solutions to a given mixer, and thereafter completing the polymerization in preferably from 20 seconds to 60 minutes, and more preferably 20 seconds to 40 minutes, or maintaining thereat for 60 to 200 minutes. In addition, the heating may be carried out in a single step, or in plural steps of two or more steps.

After the termination of bulk polymerization, for example, demolding is carried out by mold-opening a mold frame [step (4)], whereby a molded article can be obtained. The demolding as used herein refers to taking out of a molded article from a mold used. Since a molded article immediately after the production is in a high-temperature state, it is preferable that the demolding is carried out after cooling the molded article to an ambient temperature.

Composite Molded Article

As described above, the molded article of the present invention is obtained. The molded article of the present invention shows a flexural strength at 150° C. (flexural strength 1) is 25% or more of a flexural modulus at 23° C. (flexural strength 2). The proportion can be obtained by dividing the flexural strength 1 by the flexural strength 2, and multiplying by 100. Showing a proportion of the flexural strength 1 to the flexural strength 2 means that the molded article of the present invention maintains a sufficient mechanical strength even at a high temperature region, for example, 150°C. or higher, at which the contact property of the glass fibers is lowered in a composite molded article of a resin having a lower glass transition temperature, such as an epoxy resin or a vinyl ester resin, so that the slippage of the glass fibers is generated by an external stress. Therefore, the molded article of the present invention is said to have excellent mechanical strength in a wide temperature region. Here, the flexural strength at 150° C. is usually from 100 to 200 MPa, and preferably from 110 to 190 MPa, and on the other hand, the flexural strength at 23° C. is usually from 400 to 800 MPa, and preferably from 450 to 750 MPa. The flexural strength of the molded article as used herein can be obtained according to a method as prescribed in JIS K7017.

The amount of the glass fibers in the molded article of the present invention is preferably from 40 to 85% by mass, more preferably from 45 to 80% by mass, and even more preferably from 50 to 65% by mass. If the amount of the glass fibers is within the above range, a desired flexural strength is sufficiently exhibited by the molded article.

EXAMPLES

The present invention will be hereinbelow described by means of Examples, without intending to limit the present invention to these Examples.

Example 1

RIM Method

In a mold made of Aluminum 5052 which was mold-release treated having an internal dimensions of a length of 300 mm, a width of 250 mm, and a depth of 4 mm, four sheets of quadraxial glass mat KF01570-055S manufactured by NITTO BOSEKI Co., Ltd., which was cut to a size of a length of 300 mm and a width of 250 mm (basis weight: 1,500 g/m$^2$) were laminated symmetrically, and placed in the mold, and covered with a flat plate made of Aluminum 5052, and the pressure inside the mold was reduced to 100 Pa using an oil pump.

After setting the mold to 40° C., a polymerizable composition set at 20° C., composed of 100 parts by mass of RIM monomer manufactured by Nippon Zeon Co., Ltd., 5 parts by mass of trimethylolpropane trimethacrylate, 2.5 parts by mass of 2-isocyanatoethyl methacrylate, 1.5 parts by mass of di-t-butyl peroxide manufactured by Kayaku Akuzo Corporation under the manufactured product name of "Kayabutyl D(Registered Trademark), and 0.03 parts by mass of a metathesis polymerization catalyst the above compound (7), is introduced into the mold fully to allow the fibers to be impregnated. The pressure reducing line and the composition introducing line are closed, and the mold was allowed to stand for 1 hour. Subsequently, the temperature of the mold was raised to 90° C. and allowed to stand for 1 hour, and thereafter the temperature was further raised to 150°C. and allowed to stand thereat for 1 hour. Here, the components of the above RIM monomers are composed of about 90 parts by mass of dicyclopentadiene and about 10 parts by mass of tricyclopentadiene.

The mold was cooled to an ambient temperature, and thereafter a cured composite molded article was demolded. The flexural strength at 23°C. was measured as prescribed in JIS K7017, and as a result, the flexural strength was 580 MPa. The measurement was conducted in the same manner as above except for changing the measurement temperature to 150° C., and as a result the flexural strength was 154 MPa. The flexural strength at 150° C. was 26.6% of the flexural strength at 23° C.

Example 2

Infusion Method

A sealant tape made of silicone was arranged along the outer circumference of a flat plate-shaped mold made of aluminum which was mold-release treated having sizes of 500 mm×500 mm, and one sheet of an FEP film having mold-releasing property having a length of 400 mm and a width of 400 mm was provided in its internal side. Eight sheets of glass cloth WR800C-100CS (basis weight: 800 g/m$^2$) manufactured by NITTO BOSEKI Co., Ltd. cut into sizes of a length of 300 mm and a width of 250 mm were stacked and provided on the FEP film. One sheet of an FEP film (400 mm×400 mm) was further provided on an upper part of the laminated glass fiber substrate, and one sheet of PEELPLY (60001NATURALPEELPLY, manufactured by Richmond, sizes 370 mm×370 mm) was provided on an upper part thereof, and further one sheet of a bag material (VAC-PAC2000, manufactured by Richmond) was provided, and a composition-introducing line and a suction line were set between the sealant tape made of silicone and the bag material. The composition-introducing line is closed, and a vacuum pump is connected to the suction line to reduce pressure in an internal of the bag material to 100 Pa.

A polymerizable composition set at. 20° C., composed of 100 parts by mass of the RIM monomer of same components as above, 2.5 parts by mass of trimethylolpropane trimethacrylate, 2.5 parts by mass of 2-isocyanatoethyl methacrylate, 1.5 parts by mass of di-t-butyl peroxide and 0.03 parts by mass of a metathesis polymerization catalyst the above compound (7) was introduced into the mold fully from the composition-introducing line that was opened to allow the fibers to be impregnated. The pressure reducing line and the composition-introducing line were closed and allowed to stand for 1 hour. Subsequently, the temperature was raised to 90° C., and allowed to stand thereat for 1 hour, and thereafter the temperature was raised to 200° C. and allowed to stand for 1 hour. After cooling to an ambient temperature, a cured composite molded article was taken out of the bag material.

The flexural strength at 23° C. was measured as prescribed in JIS K7017, and as a result, the flexural strength was 590 MPa. The measurement was conducted in the same manner as above except for changing the measurement temperature to 150° C., and as a result the flexural strength was 160 MPa. The flexural strength at 150° C. was 27.1% of the flexural strength at 23° C.

It can be seen from Examples 1 and 2 that according to the method of the present invention, molded articles having excellent mechanical strength having a desired flexural strength can be obtained.

INDUSTRIAL APPLICABILITY

Since the composite molded article of the present invention has excellent mechanical strength, the composite molded article can be suitably used in fields in which glass fiber composite materials are generally used, for example, housings and structural parts of moving objects or movable objects.

The invention claimed is:

1. A method for producing a composite molded article having a flexural modulus at 150° C. of 25% or more of a flexural modulus at 23° C., comprising the steps of:
   (1) placing glass fibers in a mold;
   (2) impregnating glass fibers with a polymerizable composition containing a cycloolefin monomer, a metathesis polymerization catalyst, a radical generator, and a compound represented by the following general formula (I):

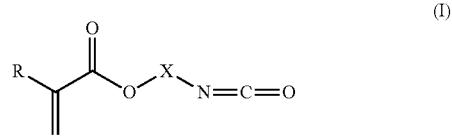

wherein R is an alkyl group having from 1 to 6 carbon atoms, and X is a divalent organic group;
   (3) subjecting the polymerizable composition with which the glass fibers are impregnated to a bulk polymerization to provide a composite molded article; and
   (4) demolding the composite molded article,
   wherein the glass fibers are hydrophobically treated with at least one treatment agent selected from the group consisting of silane coupling agents, titanate coupling agents, aluminum coupling agents, fatty acids, fats and oils, surfactants and waxes.

2. The method according to claim 1, wherein the highest temperature during the bulk polymerization is 90° C. or higher and 300° C. or lower.